3,226,623
Patented Dec. 28, 1965

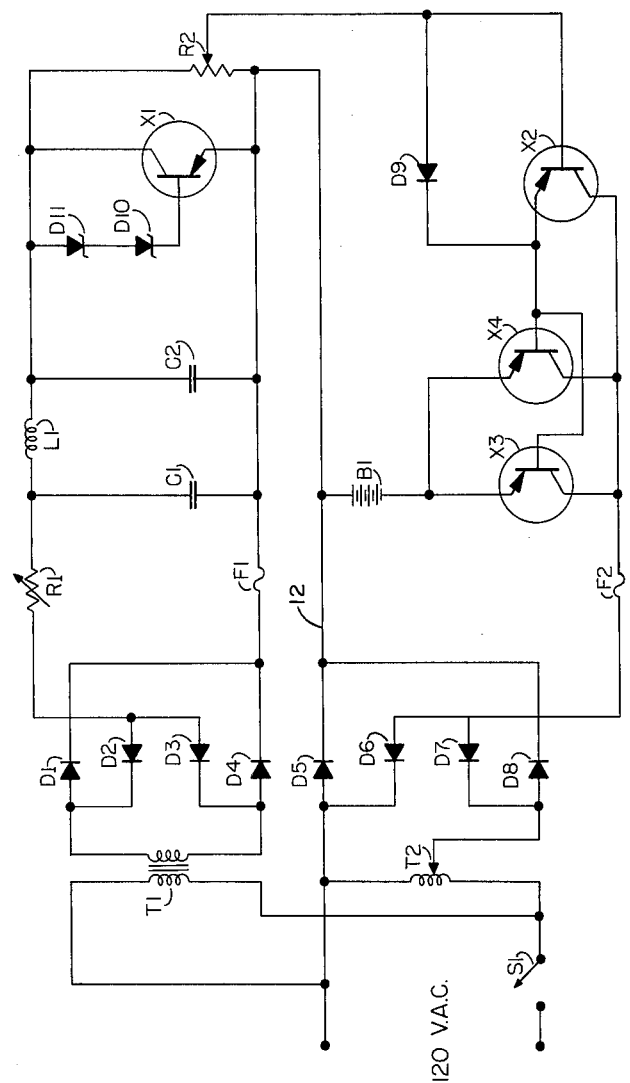

3,226,623
TRANSISTORIZED BATTERY CHARGER
Donald A. Krueger, Glenn Dale, Md., and Eugene R. Stroup, Arlington, Va., assignors to the United States of America as represented by the Secretary of the Navy
Filed Feb. 28, 1963, Ser. No. 261,908
5 Claims. (Cl. 320—43)

The invention described herein may be manufactured and used by or for the Government of the United States of America for governmental purposes without the payment of any royalties thereon or therefor.

The present invention relates to battery chargers and more particularly to chargers of the type wherein the battery voltage during charging is held within preselected limits.

There has been increasing use in recent years of battery operated devices such as beacons, data recorders, and the like. This has been made possible through the use of more sophisticated batteries which can be completely discharged, recharged with negligible damage to the cell. These cells are often sealed in order to maintain the character of the electrolyte.

Sealed cells require careful control of their terminal voltage during charging. If the voltage is too high, gas is formed in the cell, which hinders the charging function. Further, heating of the cell also results so that the gas may shatter the cell. Not only is the cell lost, in such instances, but the corrosive electrolyte may damage expensive equipment or injure personnel in the immediate vicinity.

In the past it has been conventional to provide an overvoltage trip relay to guard against this eventuality. In such cases it was assumed that these overvoltages usually occurred when the battery was nearly recharged. In order to obtain a reasonably good charge the charging rate was kept as low as possible. Presently available voltage control circuits suitable for providing a fast charging rate are large, heavy and expensive.

An object of the present invention is to provide a battery charger with a fast charge rate which has exceptionally good voltage regulation and yet is compact, lightweight and inexpensive.

A further object of the invention is to provide a novel voltage control circuit for a battery which employs transistors and zener diodes.

These and other objects and attendent advantages of the present invention are best understood with reference to the following specification taken in conjunction with the accompanying drawings wherein:

The figure shows a circuit diagram of a typical embodiment of the battery charger according to the invention.

The charger shown operates from a conventional 120 volt two wire alternating current sources. The line 12 containing D5 shall be termed the current return line and, if the unit is to be provided with a three prong grounded plug, this line would be grounded. The remaining line is provided with a single pole on-off switch S1.

To obtain the proper voltage and current for charging, a transformer T2 and a bridge rectifier, including charging diodes D5, D6, D7, and D8, are provided. The transformer is preferably of a type known as a variac, which is basically an auto-transformer with a variable tap. This provides a range of charging voltages to suit the requirements of various batteries. Diodes D5 and D7 rectify the negative half cycles of the input current and diodes D6 and D8 rectify the positive cycles.

In addition to the battery B1, to be charged, the charging current passes through a fuse F2, and one or more charge limiting transistors such as X3 and X4 connected in parallel. The fuse protects the diodes from overload currents. The transistors act as variable impedance elements to control the charging current, in a manner presently to be described.

In order to establish a reference voltage a separate circuit means is provided, having only the input terminals and switch S1 of the previously described charging elements in common. This circuit may be divided roughly into three sections. The first will be denoted as a rectifier section, the second a filter or smoothing section, and the last, as a voltage stabilizing section.

The first rectifier section includes the transformer T1; diodes D1, D2, D3, and D4; variable resistor R1 and a fuse F1. The transformer T1 is selected to provide a voltage at least as large as the greatest charging voltage to be employed. Diodes D1, D2, D3, and D4 are arranged to form a conventional full wave bridge type rectifier. Variable resistor R1 is serially connected to one output terminal of the bridge rectifier to limit the current to a safe value. As a further precaution the fuse F1 is serially connected to the remaining terminal to insure that the rectifiers will not exceed their safe operating current.

The second section of the voltage reference circuit provides a smoothing filter for the rectified current pulse from the bridge rectifier. The filter shown is a conventional pi arrangement of a series inductor L1 and two shunt capacitors C1 and C2. This and more sophisticated smoothing filters, which can be employed if desired, are described by Frederick E. Terman, Radio Engineers Handbook, published by the McGraw-Hill Book Company, Inc., 1943, pp. 606–610.

The third section of the voltage reference circuit standardizes the output voltage of the filter section at a preselected value. This value is determined by one or more serially connected zener diodes D10 and D11. The diodes establish the base to collector voltage of a regulating transistor X1. The collector to emitter voltage is supplied by the output of the filter section to which these electrodes are connected. The resistor R2 is connected in parallel with X1, so that the bridge current divides between the two. If the output voltage of the filter changes, the impedance of X1 is altered to maintain a constant current in resistor R2.

The voltage thus developed across R2 is used to control the charging current through battery B1. To reference the two voltages the more positive end of battery B1 is connected to the more positive end of resistor R2. The tap on resistor R2 is connected to the base of a bias amplifying transistor X2. This transistor has its emitter coupled to the base of charge limiting transistors X3 and X4 and its collector to the bridge terminal with the collectors of the latter. The diode D9 conducts the collector-emitter leakage current associated with transistor X2, so that it does not pass through the emitters of charge limiting transistors X3 and X4.

Thus, transistor X2, having an input circuit connected between resistor R2 and the positive terminal of battery B1, and an output circuit connected between the parallel bases of transistors X3 and X4 and the positive terminal of battery B1, is responsive to the difference between the constant voltage from the tap on resistor R2 to the return line 12 and the voltage from its emitter to return line 12. Since the voltage between the emitter of transistor X2 and return line 12 is equal to the voltage across battery B1 minus the voltage drop in the parallel base-emitter circuits of transistors X3 and X4 and since the voltage drop in the base-emitter circuit of a transistor is small, the voltage between the emitter of transistor X2 and return line 12 is substantially equal to the voltage across battery B1, and, for all practical purposes, can be considered to be equal to the voltage across battery B1. The emitter current of transistor X2 which drives the bases of transistors X3 and X4 is proportional to the amount of voltage difference between the constant voltage from the tap on resistor R2 to the return line 12 and the voltage across battery B1. The impedance of transistors X3 and X4 varies inversely to that voltage difference which is applied to the base of X2. Thus, as the battery potential increases, the positive bias on the base of transistor X2 increases, thereby decreasing emitter-to-base current of transistor X2 so that the base current drive of transistors X3 and X4 decreases to decrease conduction and increase the impedance of transistors X3 and X4.

To operate the charger only three adjustments need be made. The resistor R1 is adjusted to provide a well regulated voltage across resistor R2, i.e., diodes D11 and D10 are conducting but are well below their saturation values. The tap on resistor R2 is then adjusted so that the voltage between it and the positive battery terminal is slightly less than the desired charging potential across the battery. The tap on transformer T2 is then adjusted until the desired charging potential is obtained.

The values of the elements in FIG. 1 are as follows:

T1—40 watt isolation transformer
T2—Variac 1.75 amperes, 120 volts A.C.
R1—Adjustable resistor, 400 ohms, 12 watts
R2—Potentiometer, 750 ohms, 12 watts
F1—Fuse ⅛ ampere
F2—Fuse 1.5 amperes
S1—Manual switch
B1—Test battery
D1, D2, D3, D4—Diodes M150
D5, D6, D7, D8—Diodes 40LF
D9—Diode M500
X1—Transistor 2N268
X2, X3, X4—Transistors 2N174
D11—Zener diode, 12 volt
D10—Zener diode, 27 volt Other modifications of these embodiments are readily apparent. Half wave rectifiers can be employed, but with obvious reductions in efficiency. Those skilled in the art can substitute other types of transistors by reversing the polarity of various diodes in the circuit. Additional transistors and/or diodes can be connected in parallel with the elements shown to provide greater charging current or better regulation.

Obviously many modifications and variations of the present invention are possible in the light of the above teachings. It is therefore to be understood that within the scope of the appended claims the invention may be practiced otherwise than as specifically described.

What is claimed is:
1. A battery charger comprising:
 a pair of input terminals for receiving a source of power;
 first and second rectifier means coupled to said input terminals;
 variable voltage means coupling said second rectifier means to said input terminals;
 first and second output terminals adapted to be connected to a battery to be charged;
 variable impedance means connecting the output current from said second rectifier means to said first output terminal, said second output terminal being connected through said second rectifier means to one of said input terminals, said variable impedance means having a control electrode;
 constant voltage means responsive to the output of said first rectifier means, said constant voltage means being selectively adjustable to provide different levels of constant voltage;
 amplifier means having an input circuit and an output circuit, said input circuit being connected between said constant voltage means and said second output terminal and said output circuit being connected between said control electrode of said variable impedance means and said second output terminal so that said amplifier means is responsive to the difference between said constant voltage and the voltage across said output terminals to control the impedance of said variable impedance means;
 whereby, upon the adjustment of said variable voltage means to supply the potential required by the battery to be charged and the selection of said constant voltage to be slightly less than said battery potential, a battery connected to said output terminal will be charged until its potential is substantially equal to the constant voltage supplied by said constant voltage means.

2. A battery charger as recited in claim 1, wherein said first and second rectifier means are full wave diode bridges.

3. A transistorized battery charger comprising:
 input means for receiving a source of power;
 first and second output terminals adapted to be connected across the battery to be charged;
 variable voltage means connected to said input means to provide the potentials of the various batteries to be charged;
 charge limiting transistor means connecting said variable voltage means to said first output terminal, said charge limiting means having a control electrode;
 constant voltage transistor means connected to said input means, said constant voltage means being selectively adjustable to provide different levels of constant voltage, and the output of said constant voltage means being adjusted to provide a constant voltage slightly below the desired potential of the battery to be charged;
 amplifier means having an input circuit and an output circuit, said input circuit being connected between said constant voltage means and said second output terminal and said output circuit being connected between said control electrode and said second output terminal so that said amplifier is responsive to the difference between said constant voltage and the voltage across said output terminal to control said charge limiting means.

4. A transistorized battery charger as recited in claim 3, wherein said constant voltage means is connected to said input means by a transformer, a full wave rectifier and a filter connected in series, said transformer being connected to said input means.

5. A transistorized battery charger as recited in claim 3, wherein said constant voltage means comprises a transistor shunted by a variable resistor, said transistor being biased by a zener diode.

References Cited by the Examiner

UNITED STATES PATENTS

| | | | |
|---|---|---|---|
| 2,942,174 | 6/1960 | Harrison | 323—22 |
| 3,018,432 | 1/1962 | Palmer | 320—51 |
| 3,123,759 | 3/1964 | Grey | 320—40 |
| 3,179,871 | 4/1965 | Bagno | 320—30 |

LLOYD McCOLLUM, *Primary Examiner.*
S. WEINBERG, *Assistant Examiner.*